Patented Aug. 21, 1945

2,383,399

UNITED STATES PATENT OFFICE 2,383,399

MODIFIED MALEIC ANHYDRIDE-TERPENE REACTION PRODUCTS AND METHOD OF PRODUCING SAME

William E. Lundquist, Wilmington, Del., assignor to E. I. du Pont de Nemours & Company, Wilmington, Del., a corporation of Delaware No Drawing. Application October 6, 1941,
Serial No. 413,903

2 Claims. (Cl. 260—78)

This invention relates to polymeric materials and to their preparation.

Acidic reaction products have been prepared from cyclic terpenes and maleic anhydride. These products are shown by analysis to consist principally of low molecular weight addition products formed from one molecule of terpene and one or two molecules of maleic anhydride, and to contain but small proportions of higher polymers. A commercially available terpene, for instance, when heated with maleic anhydride to 165°–170° C. for three hours results in only a 20% yield of higher polymer with the remainder of the product consisting of simple addition products. Because of their low average molecular weight these products are unsuited for a large number of uses where higher molecular weight materials are desired, as for example in tanning.

This invention has as an object the preparation of high molecular weight polymers in good yields from a reaction mixture comprising maleic anhydride and a high proportion of the low cost terpenes.

These objects are accomplished in the manner more particularly pointed out hereinafter wherein maleic anhydride and cyclic terpenes of the formula $C_{10}H_{16}$ are copolymerized with a third component capable of rapid and exothermic polymerization with maleic anhydride and consisting of a compound of the group consisting of polymerizable vinyl, vinylidene, and vinylene compounds. More particularly these compounds are polymerizable monoolefinic organic compounds containing a

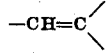

group in which the non-hydrogen bearing carbon is attached to an organic radical containing a carbon atom joined to another atom by a plural bond, the carbon atom being removed from the

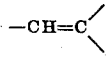

group by not more than one atom, and in which the remaining valences of the

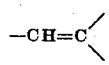

radical are satisfied by hydrogen or hydrocarbon radicals. By formula these compounds may be defined as polymerizable monoolefinic organic compounds having the formula

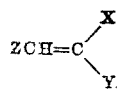

wherein Z is hydrogen or a hydrocarbon radical, X is hydrogen or a hydrocarbon radical, and Y is an organic radical containing a carbon atom joined to another atom by a plural bond, said carbon atom being removed from the

radical by not more than one atom. Z and Y may be connected. In the preferred compounds Y is an aromatic hydrocarbon radical, and Z is connected thereto, for example as in styrene and indene, respectively.

I have found that high molecular weight resinous polymers are obtained in excellent yields through the activating effect of the above mentioned third component from reaction mixtures containing a large proportion of the relatively inexpensive but difficultly polymerizable terpene. Because of the nearly quantitative yields obtained, the third reactant or activating agent is preferably a polymerizable vinyl, vinylene or vinylidene compound having an aromatic hydrocarbon radical attached to the unsaturated group as, for example, in styrene, α-methyl styrene, and indene.

Thus particularly valuable polymers in high yields are obtained from 20% to 60% of the cyclic terpene, 35% to 60% of maleic anhydride and 5% to 30% of the vinyl, vinylene or vinylidene compound, the compounds selected to total 100% and these proportions being based on the amount of these three ingredients contained in the reaction mixture.

Inert solvents such as xylene, while not essential, may be used in these polymerizations to render the reaction mixture homogeneous. The use of a higher proportion of solvent than about 50%, based on the total weight of the reaction mixture, is usually not advantageous for economic reasons.

An advantageous method for carrying out the invention is as follows: The reactants are placed in a vessel equipped with a reflux condenser and a stirrer. The ratio of reactants is generally such that the amount of maleic anhydride used (in moles) equals the sum of the molar amount of terpene plus the molar amount of the activating unsaturated material used, although other ratios of reactants may also be employed. Polymerization is effected by heating the reactants to about 100° C. and adding benzoyl peroxide catalyst. The polymerization is exothermic and proceeds rapidly but without violence. After cooling, the reaction mixture may be extracted with ether or benzene to isolate the polymeric product. The unsaturated starting materials, the simple 1:1 terpene-maleic anhydride addition products, and low molecular weight terpene-maleic anhydride copolymers having a molecular weight below about 300 are all soluble in these solvents, whereas the higher molecular weight polymers of the type described in this invention are insoluble. The product may also be treated by digesting the reaction mixture with aqueous caustic, whereupon all acidic reaction products formed by hydrolysis of the anhydride groupings in the products will pass into solution in the aqueous layer, and may be separated from the oily layer consisting of solvent, small amounts of unreacted starting material, and the like. In this case, any low molecular weight acidic products of side reactions, which, in any case, are present in small proportions, pass into the polymer solution.

The three component copolymers of this invention may be prepared in good yield without the use of any catalyst, but the reaction proceeds more smoothly with higher yields of polymer when a peroxide catalyst, such as benzoyl peroxide, is used.

In order to obtain a controlled rate of reaction, it is very desirable to add the benzoyl peroxide catalyst slowly to the reaction mixture throughout the polymerization. An even more preferred method for controlling the rate of reaction is to heat the maleic anhydride and terpene to 100°–120° C. and add slowly throughout the course of the reaction a solution of the benzoyl peroxide catalyst dissolved in the activating component. By this procedure very high yields of polymer are obtained.

The invention is further illustrated by the following examples in which the parts are by weight:

Example I

Two hundred four parts of dipentene and 196 parts of maleic anhydride are heated to 120° C. with stirring. A solution of 6 parts of benzoyl peroxide in 52 parts of styrene and 41 parts of xylene is then added slowly to the reaction mixture at such a rate as to maintain the temperature between 140° and 150° C. This requires about ½ hour. An additional three parts of benzoyl peroxide is then added in small portions over a period of 10 minutes. The product is then allowed to cool, and the reaction mixture is extracted with ether to obtain 340 parts of ether-insoluble polymeric product which is equivalent to 75% of the total weight of reactants. Analysis of this product shows that it contains about 58% of maleic anhydride groupings indicating that the conversion of maleic anhydride to copolymer is quantitative.

The isolation by ether extraction in the above process, useful for purposes of yield determination, may be eliminated and the reaction mixture worked up directly for use as follows: The crude reaction product is treated with 60 parts of sodium hydroxide and 1300 parts of water. The temperature of the mixture is kept at 95°–100° C. until hydrolysis of the polymer is complete. The upper organic layer, consisting of xylene and some unreacted dipentene, is then removed, leaving an aqueous solution of the partial sodium salt of the hydrolyzed dipentene/styrene/maleic anhydride copolymer at a pH of about 5. After diluting this solution to 10% concentration based on unhydrolyzed copolymers and adjusting the pH to 5.2, the solution is found to have a viscosity of 3 centipoises. When the above reaction is carried out in the absence of styrene but with benzoyl peroxide catalyst the yield of the polymer is but 37%.

Example II

One hundred thirty-six parts of dipentene, 196 parts of maleic anhydride, 52 parts of styrene and 41 parts of xylene are heated to 100° C. with stirring and 2 parts of benzoyl peroxide catalyst is added. The exothermic polymerization which takes place causes the temperature to rise to 150° C. When this initial reaction has subsided a solution of 4½ parts of benzoyl peroxide catalyst in 52 parts of styrene and 41 parts of xylene is added slowly to the reaction mixture at such a rate as to maintain the temperature at 140°–150° C. This addition requires about ½ hour. An additional ½ part of catalyst is then added. After the reaction mixture is cooled, it is extracted with ether to obtain 381 parts of ether-insoluble, polymeric product which amounts to 87% of the weight of reactants. Analysis shows that it contains about 53% of maleic anhydride indicating that the conversion of maleic anhydride to polymer is quantitative. A hydrolyzed aqueous solution adjusted to 10% concentration based on the unhydrolyzed copolymer and to a pH of 5.2 is found to have a viscosity of 6 centipoises.

Example III

One hundred two parts of dipentene and 98 parts of maleic anhydride are heated to 110° C. with stirring. A solution of 4 parts of benzoyl peroxide in 29 parts of indene and 6 parts of highly alkylated aromatic compounds of about the same boiling point range is added slowly to the reaction mixture at such a rate to maintain the reaction temperature at 120°–140° C. The addition is complete in less than one hour. Then, one additional part of catalyst is added and the product is allowed to cool. The yield of ether-insoluble polymeric product amounts to 124 parts or 63% of the total weight of the reactants. A hydrolyzed aqueous solution containing 10% of unhydrolyzed copolymer, and adjusted to a pH of 5.2 is found to have a viscosity of 3 centipoises.

Example IV

Sixty-eight parts of dipentene and 98 parts of maleic anhydride are heated to 110° C. A solution of 4 parts of benzoyl peroxide in 43 parts of vinyl acetate is added slowly to the reaction mixture which is kept under reflux to avoid loss of the low-boiling vinyl acetate. Then an additional part of peroxide catalyst is added to the reaction mixture. The yield of ether-insoluble polymeric product amounts to 101 parts or 48% of the weight of the reactants.

Example V

One hundred ninety-six parts of maleic anhydride, 204 parts of alpha-pinene, 52 parts of styrene, and 41 parts of xylene are heated to 125° C. in an open reaction vessel with stirring. After a small initial exothermic reaction has subsided, 8 parts of benzoyl peroxide is added slowly to the reaction mixture with constant stirring at such a rate as to maintain the reaction temperature between 125° and 150° C. The yield of benzene-insoluble polymeric product amounts to 213 parts or 47% of the total weight of reactants. The maleic anhydride and terpene alone in the above process yield only 7% of the polymer.

Example VI

Thirty-four parts of alpha-pinene, 49 parts of maleic anhydride, 26 parts of styrene and 17 parts of xylene are heated to the boiling point without catalyst. The vigorous polymerization which occurs is over in about five minutes. The product is digested with aqueous caustic to effect hydrolysis. The aqueous layer is then treated with hydrochloric acid to obtain 65 parts of acid-insoluble polymeric product.

Example VII

Fifty-one parts of beta-pinene, 49 parts of maleic anhydride, 13 parts of styrene, and 10 parts of xylene are heated on a steam bath to 90° C. Two-tenths part of benzoyl peroxide is is then added and the temperature very slowly and smoothly rises to around 160° C. After cooling, the product is extracted with ether to obtain 91 parts of ether-insoluble, polymeric product which is equivalent to 81% of the weight of reactants.

Example VIII

Fifty-one parts of a camphene and 49 parts of maleic anhydride are heated to 100° C. with rapid stirring. A solution of 2 parts of benzoyl peroxide in 13 parts of styrene and 10 parts of xylene is added slowly to the reaction mixture from a dropping funnel. After this addition, an additional part of benzoyl peroxide is added to the reaction mixture. The ether-insoluble product amounts to 38 parts or 34% of the weight of the reactants. In the absence of the styrene, polymer was not obtained in sufficient amount for isolation.

Example IX

One hundred two parts of the commercial terpene fraction boiling at 175°–187° C. and 98 parts of maleic anhydride are heated to 130° C. A solution of 4 parts of benzoyl peroxide in 26 parts of styrene and 26 parts of xylene is then added slowly to the reaction mixture at such a rate as to maintain the reaction temperature at 130°–140° C. At the end of the reaction an additional one-half part of benzoyl peroxide catalyst is added. After cooling the product is extracted with ether to obtain 147 parts of ether-insoluble polymeric product which is equivalent to a 65% yield based on the total weight of reactants.

Example X

One hundred two parts of the commercial terpene boiling at 167°–182° C. and 98 parts of maleic anhydride are heated to 100° C. A solution of 4 parts of benzoyl peroxide in 26 parts of styrene and 26 parts of xylene is added slowly to the reaction mixture at such a rate as to maintain the reaction to 140°–150° C. The yield of ether-insoluble polymeric product amounts to 147 parts or 65% of the weight of the reactants.

Example XI

One hundred two parts of the $C_{10}H_{16}$ terpene mixture obtained as a by-product from the conversion of alpha-pinene to camphene, 26 parts of styrene, 98 parts of maleic anhydride, and 20 parts of xylene are heated to 120° C. Four and five-tenths parts of benzoyl peroxide catalyst is added slowly to the reaction mixture, maintaining the temperature at 115°–120° C. The reaction mixture is finally heated to 170° C. for ¾ hour. The yield of ether-insoluble polymeric product amounts to 102 parts or 45% of the weight of the reactants.

Example XII

Sixty-eight parts of dipentene and 98 parts of maleic anhydride are heated to 110° to 120° C. in a reaction vessel equipped with a stirrer and a reflux condenser. A solution of 4 parts of benzoyl peroxide dissolved in 45 parts of methyl acrylate is slowly added to the reaction mixture, keeping the polymerization temperature between 110° and 130° C. An additional part of benzoyl peroxide is then added. After cooling the reaction mixture the polymeric product is isolated by extracting the unreacted starting materials and the low molecular weight condensation products with ether in which they are soluble. The yield of ether-insoluble product amounts to 118 parts or 56% of the weight of reactants.

A reaction similar to that carried out above using 49 parts of maleic anhydride yielded 83 parts of ether-insoluble product or 51% by weight.

Example XIII

Sixty-eight parts of dipentene, 30 parts of acrylonitrile and 98 parts of maleic anhydride are reacted as in Example XII. The yield of 74 parts or 38% by weight of ether insoluble polymeric material was obtained.

A reaction similar to the above using 49 parts of maleic anhydride yielded 57 parts of ether-insoluble product or a yield of 39% by weight.

In place of the styrene mentioned in the examples, the third component or activating agents can also, but with somewhat less advantage with regard to yield, consist of various other vinyl, vinylidene, and vinylene compounds, for example, vinyl esters, ethers, ketones, e. g. vinyl acetate, vinyl phenyl ether, methyl vinyl ketone; vinyl imides, e. g. vinyl succinimide; aryl vinylene compounds wherein the vinylene group is attached directly to the nuclear carbon, e. g. indene, stilbene and 1,2-dihydronaphthalene, alpha-methylene aliphatic monocarboxylic acids, their esters, amides and nitriles, e. g. acrylic acids, methacrylic acids, methyl acrylate, methyl methacrylate, methacrylamides, methacrylonitrile, and acrylonitrile. In addition, alkyl styrenes such as α-methyl styrene and alkyl indenes such as α-methyl indene are operative.

Among the suitable terpenes readily available from industrial sources there may be mentioned dipentene, alpha-pinene, beta-pinene, camphene, alpha-terpinene, phellandrene, terpinolene, and so forth. Dipentene, alpha-pinene and alpha-terpinene are particularly useful because of their plentiful availability and the high yields which they give in the process of this invention. They have the molecular formula $C_{10}H_{16}$ and contain one or two double bonds per molecule. The terpenes may be used in the pure state or as the commercial mixtures obtained by fractionation of wood turpentine.

Commercial maleic anhydride is well suited for these reactions without any special refinement. It is obtained by oxidizing benzene and a variety of other hydrocarbons containing at least 4 carbon atoms in a straight chain. Maleic acid is not an equivalent of maleic anhydride in these reactions. Interpolymers are not obtained from maleic acid unless the reaction is carried out under conditions which will first convert the maleic acid to maleic anhydride.

Materials suitable for use as solvents should preferably boil at 70° C. or above, be inert to maleic anhydride, and be readily separated from the product. Among suitable solvents may be mentioned benzene, toluene, xylene, higher alkylated benzenes, dioxan, acetone, methyl ethyl ketone, etc.

Peroxides which may serve as catalysts are organic solvent soluble and include benzoyl peroxide, acetyl peroxide, butyryl peroxide, lauroyl peroxide, succinyl peroxide, and ascaridole. Benzoyl peroxide, the preferred catalyst, is generally used in amounts ranging from 0.1–5%. The reaction may also be catalyzed by other catalysts such as ultra-violet light.

The copolymerization is generally carried out at temperatures of from about 80° C. to the boiling point of the reaction mixture which is usually below 175° C. Temperatures below 80° C. may be employed but the rate of reaction generally becomes very slow as the temperature is decreased. When the reaction is carried out at 100° C. or above it is usually complete in one hour or less.

The molar proportion of reactants is frequently chosen so that the moles of maleic anhydride equal the sum of the moles of terpene plus the moles of activating component, although an excess of this terpene may be used to advantage. The molar ratio of maleic anhydride:terpene:activating component most commonly used is 4:3:1 although ratios of from 16:15:1 to 2:1:1 may be used. The ratio of reactants to be employed varies with the type of product desired, for example, maleic anhydride-dipentene-styrene copolymers prepared from a 2:1:1 reaction mixture are of higher average molecular weight than copolymers prepared from a 4:3:1 reaction mixture. Inasmuch as the commercial terpenes are cheaper than the materials used as activating components it is generally desirable to use a high proportion of terpene in the reaction mixture.

By means of the present process valuable polymers in high yields are obtained from reaction mixture containing large proportions of the readily available and inexpensive terpenes. The polymers obtained by the present process are useful in a variety of applications, examples of which are tanning agents, photographic chemicals, gelatin substitutes, agents for treating textile materials, agents to be used in connection with the dyeing of leather, petroleum chemicals, protein hardeners, alkyd resin ingredients, etc.

As many apparently widely different embodiments of this invention may be made without departing from the spirit and scope thereof, it is to be understood that I do not limit myself to the specific embodiments thereof except as defined in the appended claims.

I claim:

1. A process for making polymeric carboxylic anhydrides from reactants consisting essentially of maleic anhydride, a terpene having not more than two double bonds per molecule and having the formula $C_{10}H_{16}$, and a polymerizable mono-olefinic compound selected from the group consisting of styrene and indene, said process comprising simultaneously polymerizing the maleic anhydride and said terpene with said mono-olefinic compound in proportions, based on the weight of said reactants, of 20% to 60% of said terpene, 35% to 60% of the maleic anhydride, and 5% to 30% of said mono-olefinic compound.

2. A process for making polymeric carboxylic anhydrides from reactants consisting essentially of maleic anhydride, a terpene having not more than two double bonds per molecule and having the formula $C_{10}H_{16}$, and a polymerizable mono-olefinic compound selected from the group consisting of styrene and indene, said process comprising simultaneously polymerizing in the presence of a peroxide catalyst the maleic anhydride and said terpene with said mono-olefinic compound in proportions, based on the weight of said reactants, of 20% to 60% of said terpene, 35% to 60% of the maleic anhydride, and 5% to 30% of said mono-olefinic compound.

WILLIAM E. LUNDQUIST.